United States Patent
Nilsson et al.

[15] 3,704,834
[45] Dec. 5, 1972

[54] APPARATUS FOR DISINTEGRATION AND SEPARATION OF SOIL AND SIMILAR MATERIALS

[72] Inventors: Harry Nilsson, Stjarnvagen 10, 172 46 Sundybert; Gunnar Larsson, Pinnmovagen 6, 803 50 Gavle, both of Sweden

[22] Filed: Feb. 16, 1971

[21] Appl. No.: 115,379

[30] Foreign Application Priority Data

Feb. 20, 1970  Sweden ............................ 2168/70

[52] U.S. Cl. ............. 241/79.2, 241/101 M, 241/154, 241/186 R
[51] Int. Cl. ...................... B02c 13/02, B02c 13/20
[58] Field of Search ...... 241/79, 79.2, 101 M, 154 A, 241/154, 186 R, 187, 189 R

[56] References Cited

UNITED STATES PATENTS

| | | | |
|---|---|---|---|
| 3,412,945 | 11/1968 | Sackett | 241/154 |
| 1,776,593 | 9/1930 | Meyer | 241/152 A |
| 3,596,842 | 8/1971 | Barber | 241/79.2 X |
| 3,447,758 | 6/1969 | Oznobichine | 241/189 R |
| 3,622,089 | 11/1971 | Quinn | 241/101 M |
| 2,440,388 | 4/1948 | Wright | 241/186 R |
| 2,368,331 | 1/1945 | Seaman | 241/101 M |
| 2,644,644 | 7/1953 | West | 241/186 R |
| 3,467,320 | 9/1969 | Westfall et al. | 241/154 X |
| 3,062,461 | 11/1962 | Wetmore | 241/101 M |
| 2,824,500 | 2/1958 | Cumpston | 241/154 X |

*Primary Examiner*—Robert L. Spruill
*Attorney*—Sommers & Young

[57] ABSTRACT

An apparatus for disintegration and separation of soil material, comprising a hopper to which the soil to be treated is supplied, and a conveyor disposed at the outlet of the hopper for forwarding of soil for further treatment. The improvement comprises a grate rotor at the discharge and of the conveyor for disintegrating the soil material and throwing the same into the working area of a whipping rotor having whipping chains for further disintegration of the soil and a sieve adapted to receive the treated material and separate waste material from usable soil.

5 Claims, 3 Drawing Figures

APPARATUS FOR DISINTEGRATION AND SEPARATION OF SOIL AND SIMILAR MATERIALS

The present invention relates to an apparatus for disintegration and separation of soil, such as naturally moistened field or meadow soil, comprising a hopper to which the soil material to be treated is supplied and a conveyor disposed at the outlet of the hopper for forwarding of the soil material to further treatment. Soil for planting, laying-out of seed beds for lawns and other planting purposes must be finely disintegrated and free from stones, clay clods, roots and like. In such planting work there is often to be treated soils of widely varying quality and consistency. Thus the soil can come from lots completely overgrown with grass and weeds, fields and the like, in which there is a strongly interconnecting layer of roots. The use of correctly composed and sufficiently finely disintegrated pure soil materials is an absolute condition if the ground is to be smooth and durable. It is also necessary that the soil disintegration and separation be easily accomplished. Many different measures are daily tested to refine common arable land to meet said requirements.

Owing to the sticky character of the soil material and its natural moisture and that the soil always includes various sizes and denseness of interconnecting plant parts, all attempts with crushing and/or grinding mechanical components have failed since rapid and complete clogging of the apparatus occurs irrespective of whether there is used an apparatus using compressive movements or a combination of a rotor and stator.

The main object of the present invention therefore is to provide an apparatus which owing to a particular design will give excellent results when treating dry and naturally moistened soil as well as similar material. Another object is to provide an apparatus which disintegrates and separates, in the same apparatus, the soil into usable soil and non-desirable waste components.

The apparatus is characterized in that at the discharge end of the conveyor is mounted a rotary grate rotor for disintegrating the soil material and throwing same into the working area of a whipping rotor having whipping chains or like for further disintegrating remaining soil clods while whipping out roots and other part of the plant from the soil material, a sieve further being adapted to receive the treated material and separate waste material from usable soil.

Although the following description only refers to treatment of soil material for garden purposes, the apparatus is also able to treat other material having similar composition and consistency.

By way of example only, an embodiment of this invention will now be described with reference to the accompanying drawings in which.

Figure 1:
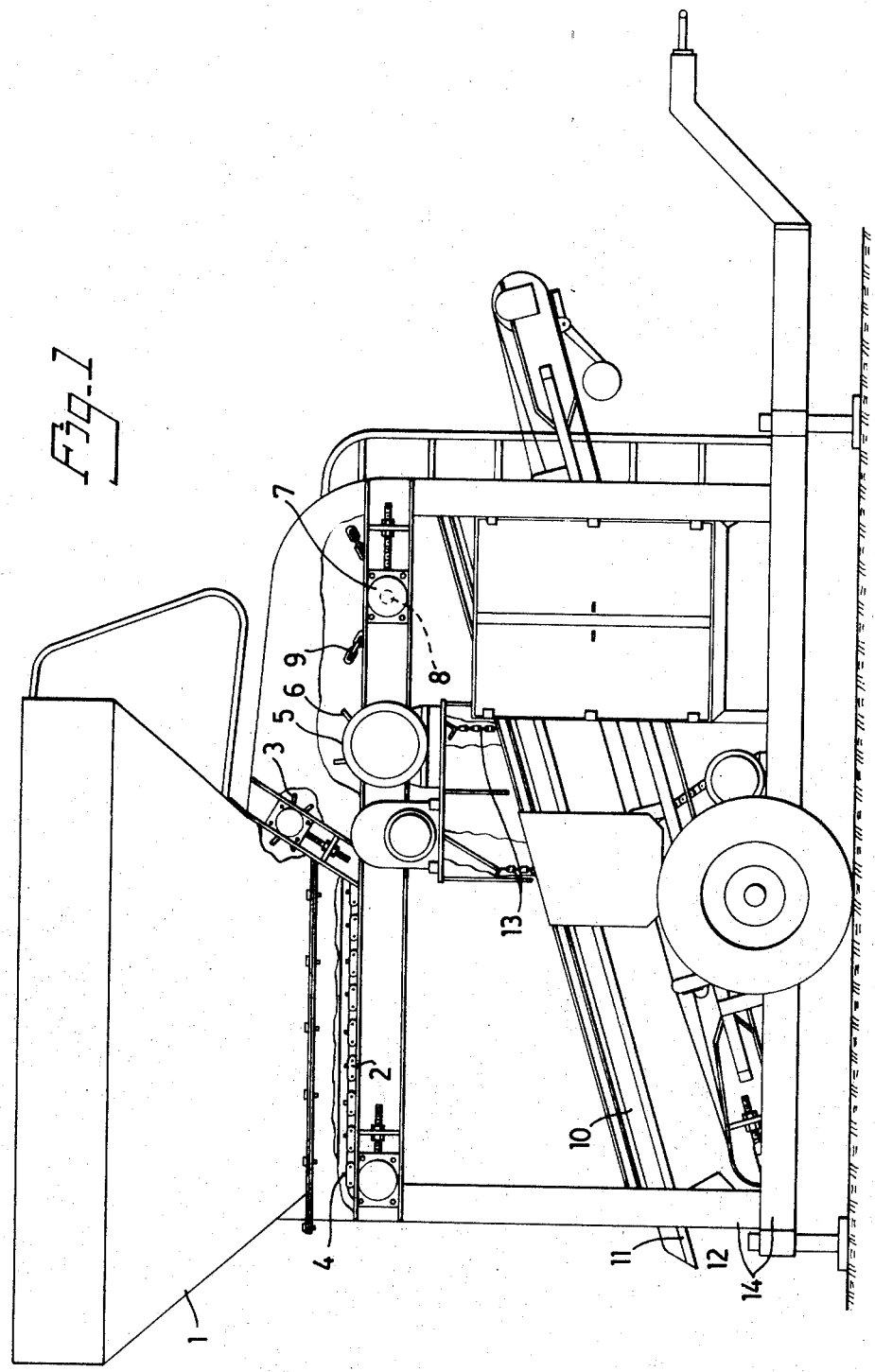
FIG. 1 is a side elevational view of the apparatus as a whole.
Figure 2:
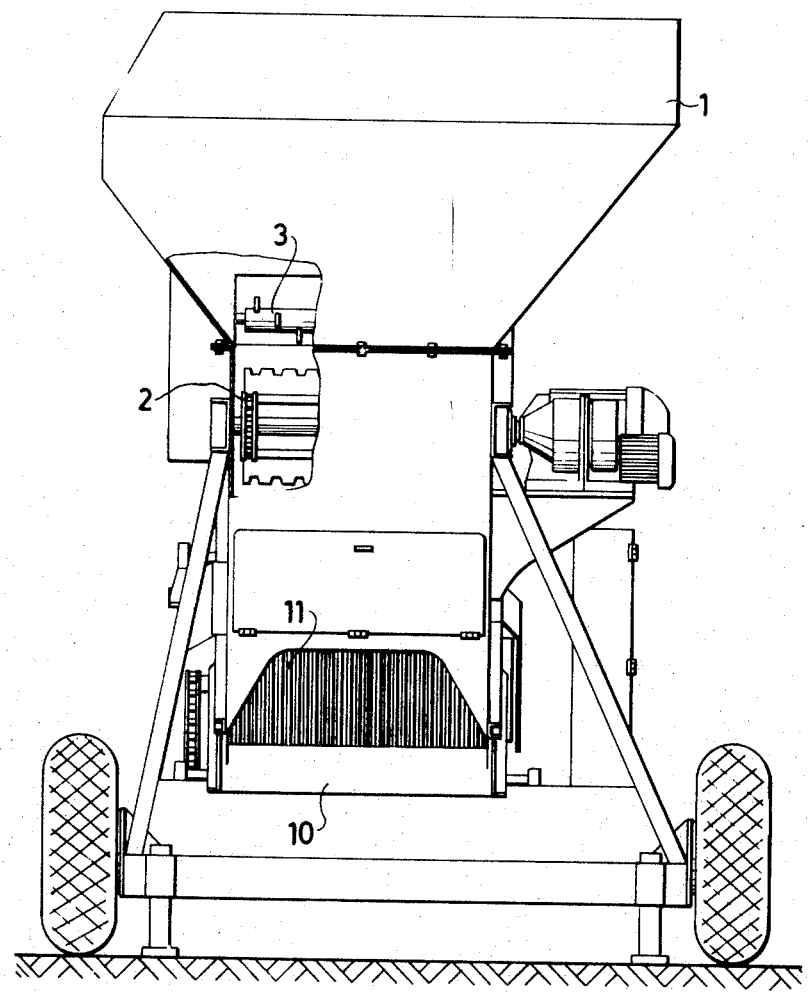
FIG. 2 is an end elevational view of same.
Figure 3:
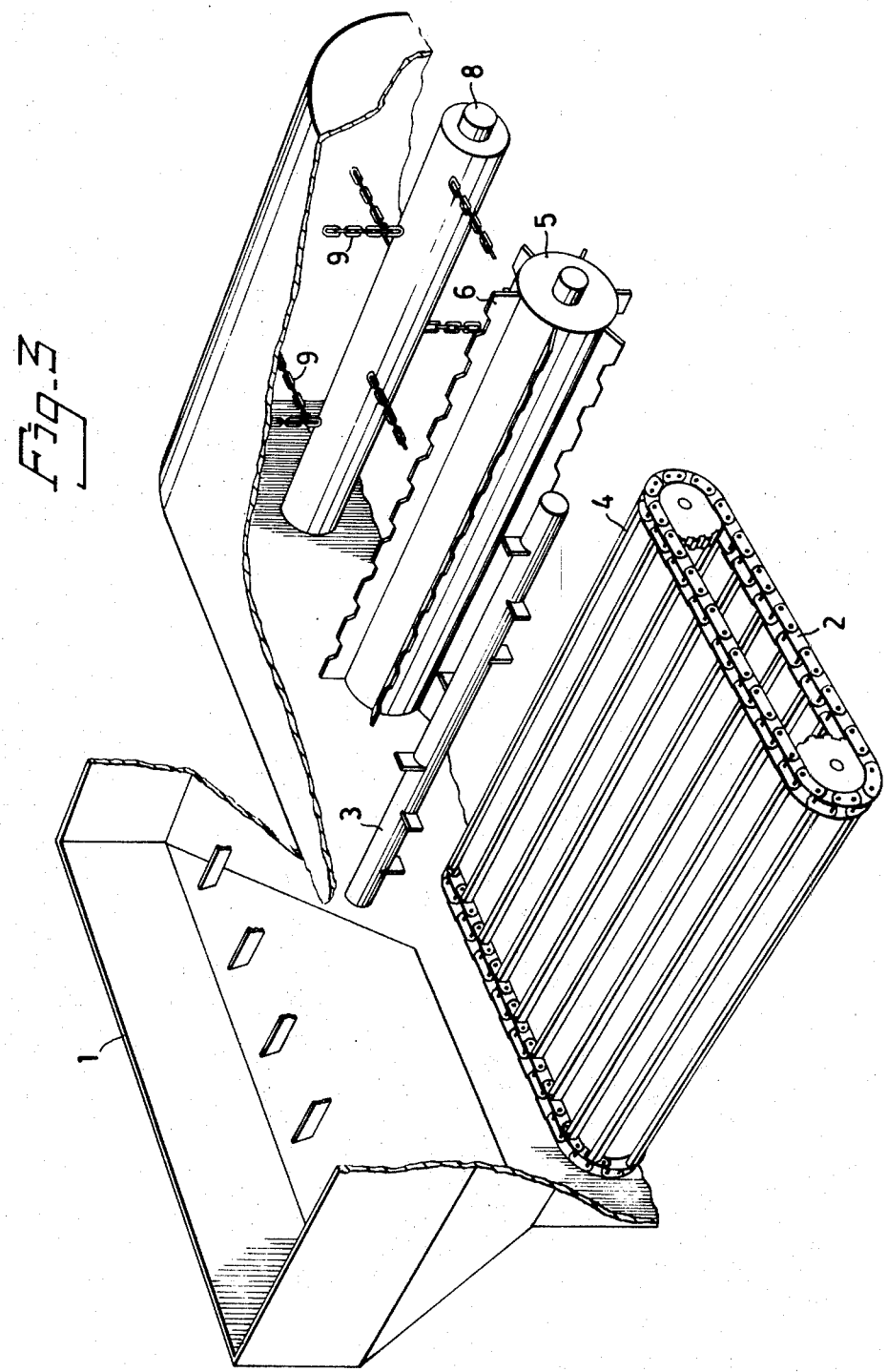
FIG. 3 is a fragmentary perspective view of a delivery unit and a cultivator rotor and a whipping rotor.

The apparatus according to the present invention comprises a frame 14, supported by wheels, if desired, the upper portion of said frame 14 carrying a hopper 1 to which the soil to be treated is supplied. A conveyor 2 provided with entraining members 4 is arranged below a lower outlet of the hopper 1. A toothed feed roller 3 is mounted adjacent said outlet to provide for a controlled uniform feeding of the soil material to a treatment station in cooperation with the conveyor 2. This station comprises, on the one hand, a rotary grate rotor 5 and, on the other, a whipping rotor 7. The grate rotor 5 has a number of longitudinal, substantially radially directed toothed blades 6 and is mounted at the discharge end of the conveyor 2, so that the axis of the rotor 5 is disposed transversely to the feed direction of the conveyor and in the plane of the latter. The whipping rotor 7 is disposed downstream of the rotor 5 and includes a rotor axis 8 having whipping chains 9 mounted thereon.

The apparatus further comprises a sieve 10 which is supported by the frame 14 and has a screen member 11 which in a suitable way is forced to vibrate and shake. Chain curtains 13 are placed above the sieve 10 to prevent treated soil material from passing by above the sieve 10 and to avoid direct ejection through a waste outlet. A discharge conveyor 12 is located below the sieve 10 to discharge the usable screened soil.

The apparatus can also be provided with a dispenser for addition of manure to the treated soil material. Said mechanical components are preferably disposed within a housing supported by the frame 14.

The apparatus can be driven by electrical motors, through well-known transmission mechanisms which need not be described in this connection. It is appreciated that various mechanical units of the apparatus can be enclosed within a housing carried by said frame 14.

In operation, the apparatus is mainly adapted to be stationary disposed adjacent to a supply of the soil to be treated, which preferably is fed to the hopper 1 of the apparatus by means of a bucket loader or the like. A controlled uniform feeding of the soil to the grate rotor 5 is achieved by co-operation of the rotation of the feed roller 3 and the forward movement of the entraining members 4 of the conveyor 2. This rotor 5 constantly mills and grates soil material from the front edge of the supplied layer of material during high rotational speed of the rotor 5. The soil material is then thrown upwardly and forwardly into the working area of the whipping rotor 7. The whipping rotor 7 separates the soil from peat and root complexes while further breaking-up of the soil clods. The treated soil material then falls down on the sieve 10 which separates the material by the vibrating screen member 11 so that usable material will pass through said screen member and fall onto the discharge conveyor 12, while the waste material continues to travel upon the member 11 until it reaches a waste storage. The conveyor 12 discharges the usable and refined material from the apparatus.

What we claim is:

1. A comminuting machine for disintegration and separation of moist soil, such as naturally moistened field or meadow soil or similar moist materials, comprising; a hopper, an endless feed conveyor disposed beneath the outlet of said hopper, a feed roller mounted adjacent the outlet of said hopper and above the discharge end of said feed conveyor to provide a positively controlled feeding of the soil material, a rotary grater rotor means mounted at the discharge end of said feed conveyor and adapted to disintegrate the soil being fed on said conveyor to said grater rotor means, a flailing chain rotor means disposed downstream of said grater rotor means for further disintegration of the soil, a housing covering the sides and the upper portion of the soil treating zone and allowing a free deflected path of the soil above said rotor means, and a vibratable screen member disposed beneath said soil treating zone.

2. An apparatus according to claim 1, in which at least one feed roller provided with teeth is disposed in the hopper adjacent the outlet thereof for providing together with the conveyor, which has entraining members, a controlled delivery of the soil material to the grate rotor.

3. An apparatus according to claim 1, wherein the grate rotor is provided with a number of radially extending blades having teeth thereon which extend along the whole length thereof.

4. An apparatus according to claim 2, wherein a discharge conveyor for usable soil is disposed below the sieve.

5. An apparatus according to claim 2, wherein chain curtains are provided above the sieve to prevent direct ejection and passage of the treated soil material above the sieve.

* * * * *